United States Patent [19]

Rüber

[11] Patent Number: 6,128,595
[45] Date of Patent: Oct. 3, 2000

[54] METHOD OF DETERMINING A RELIABILITY MEASURE

[75] Inventor: Bernhard J. Rüber, Roetgen, Germany

[73] Assignee: U.S. Philips Corporation, New York, N.Y.

[21] Appl. No.: 09/148,940

[22] Filed: Sep. 4, 1998

[30] Foreign Application Priority Data

Sep. 12, 1997 [DE] Germany ............... 197 40 147

[51] Int. Cl.[7] .................................................. G10L 15/04
[52] U.S. Cl. .................................... 704/255; 704/251
[58] Field of Search ........................... 704/255–257, 704/251

[56] References Cited

U.S. PATENT DOCUMENTS

| | | | |
|---|---|---|---|
| 4,868,750 | 9/1989 | Kucera et al. | 704/8 |
| 5,418,717 | 5/1995 | Su et al. | 704/9 |
| 5,548,507 | 8/1996 | Martino et al. | 704/1 |
| 5,555,344 | 9/1996 | Zunkler et al. | 704/242 |
| 5,625,749 | 4/1997 | Goldenthal et al. | 704/254 |
| 5,655,058 | 8/1997 | Balasubramanian et al. | 704/255 |
| 5,754,736 | 5/1998 | Aust | 704/252 |
| 5,995,931 | 11/1999 | Bahl et al. | 704/257 |

FOREIGN PATENT DOCUMENTS

0702353A2  3/1996  Germany.

OTHER PUBLICATIONS

"LVCSR Log–Likelihood Ratio Scoring for Keyword Spotting", ieee 1995, ICASSP vol. 1, pp. 297–300, Mitchel Weintraub.

*Primary Examiner*—Krista Zele
*Assistant Examiner*—Michael N. Opsasnick
*Attorney, Agent, or Firm*—Daniel J. Piotrowski

[57] ABSTRACT

In speech recognition, a reliability measure can be determined by using various sentence hypotheses with a decreasing acoustic similarity. However, if a databank inquiry is to be derived from such a speech signal, often only individual words or even a single word from the utterance are required as data for such a databank access. Such a data, for example, the time, may be contained in the speech utterance in various ways. In accordance with the invention, a reliability measure for such a data rather than for a given word is determined, in which the same data may be constituted by various words. Thus, these various words are treated equally for determining the reliability measure.

4 Claims, 2 Drawing Sheets

METHOD OF DETERMINING A RELIABILITY MEASURE

The invention relates to a method of determining a reliability measure for data constituted by a speech signal. These data are herein understood to be independent speech utterances, in which the user does not utter, for example, single command words in response to given system requests, but can freely formulate in a coherently spoken language.

In recognizing coherently spoken language, the variation width of spoken utterances makes recognition of these utterances difficult. One of the problems is to recognize the border between coherently spoken words. Also for this reason, an unambiguous recognition of a spoken utterance is rarely possible, and a plurality of alternatives having various degrees of reliability often result during recognition.

Determining reliability measures for single words within a spoken utterance is known from ICASSP 1995, Vol. I, pp. 297–300. In this method, single sentence alternatives are derived from a spoken utterance, which in accordance with their acoustic similarity with the utterance have different degrees of probability. The reliability measure for a word in such an utterance is determined by relating the sum of the probabilities of all sentence alternatives comprising this word with the sum of the probabilities of all sentence alternatives. This has the advantage that various sources of knowledge, for example, a speech model, may have been taken into account in the sentence alternatives.

Speech recognition using reliability measures may be employed in various fields. One application is, for example, the processing of spoken inquiries requested from a databank system and generating and supplying replies to these inquiries. Such an application does not require the full recognition of all words in the utterance, but only those words should be determined from which data for databank inquiries can be derived. Generally, a databank is understood to be a source of knowledge in which information is stored, with each inquiry triggering a subsequent action of the system. Such an action may also be the establishment of a connection in a telephone exchange system.

A databank inquiry system is known from EP 0 702 353 A2 (PHD 94–120 EP). In this system, a word graph is first formed from a speech signal and converted into a concept graph which comprises only words or attributes which are relevant to the databank inquiry. One or more attributes may be derived from one word or, alternatively, from a plurality of words. The parts of the utterance that are not required for the databank are converted into "fillers", of which essentially only the weighting values or scores are determined. A concept corresponds to a given significance or, generally, to an element in a quantity of alternative semantic interpretations, for example, a train timetable information system includes, inter alia, the concepts "arrival station", "departure station", "date" and "time". A number of attributes may be assigned to each concept, for example, train station names. A data can be derived from a given attribute, for example, as mentioned above, the name of a train station which is required for the databank inquiry. The complete databank inquiry is generally composed of a plurality of data. However, there are various possibilities, particularly with regard to the data of dates and times, allowing the same day or the same time to be indicated by way of different attributes, i.e. different words or word sequences.

In accordance with one aspect of the invention, a plurality of different sequences of attributes can be derived from the concept graphs, in which a sequence may also consist of a single attribute only. These different attributes in the sequences may lead to different data for a concept, but they may also result in the same data. In the latter case, this data has a greater reliability than in the case where the reliabilities of different attributes, i.e. of the different words contained therein, are considered separately.

It is an object of the invention to provide a method of determining a reliability measure which functions very advantageously for such databank inquiries.

The principle of the solution according to the invention consists in that a reliability measure is not determined for a given word, but for a given data resulting from one or more attributes. Since a plurality of various attributes may be assigned to at least some individual data, all of the different sequences of attributes that comprise an attribute for the same data are utilized for determining the reliability measure. This procedure is suitable because the databank inquiry or the access to the databank is derived from the data and not directly from an attribute.

Since the reliability measure is derived from the probability values for each sequence, while a weighting value for each sequence of attributes results from the speech recognition, it should first be converted into a probability value. To this end, the weighting value of each sequence is multiplied by a first number, for example, 0.4, and the result is used as a negative exponent for the base of the natural logarithm, and this exponent is multiplied by a factor which is chosen to be such that the sum of the probabilities of all sequences thus formed is equal to 1. The reliability measure of a given data is then determined from the sum of these probabilities of all sequences in which this data is contained.

BRIEF DESCRIPTION OF THE DRAWING

The invention will be more readily understood after reading the following detailed description taken in conjunction with the accompanying drawing, in which.

DETAILED DESCRIPTION

Figure 1:
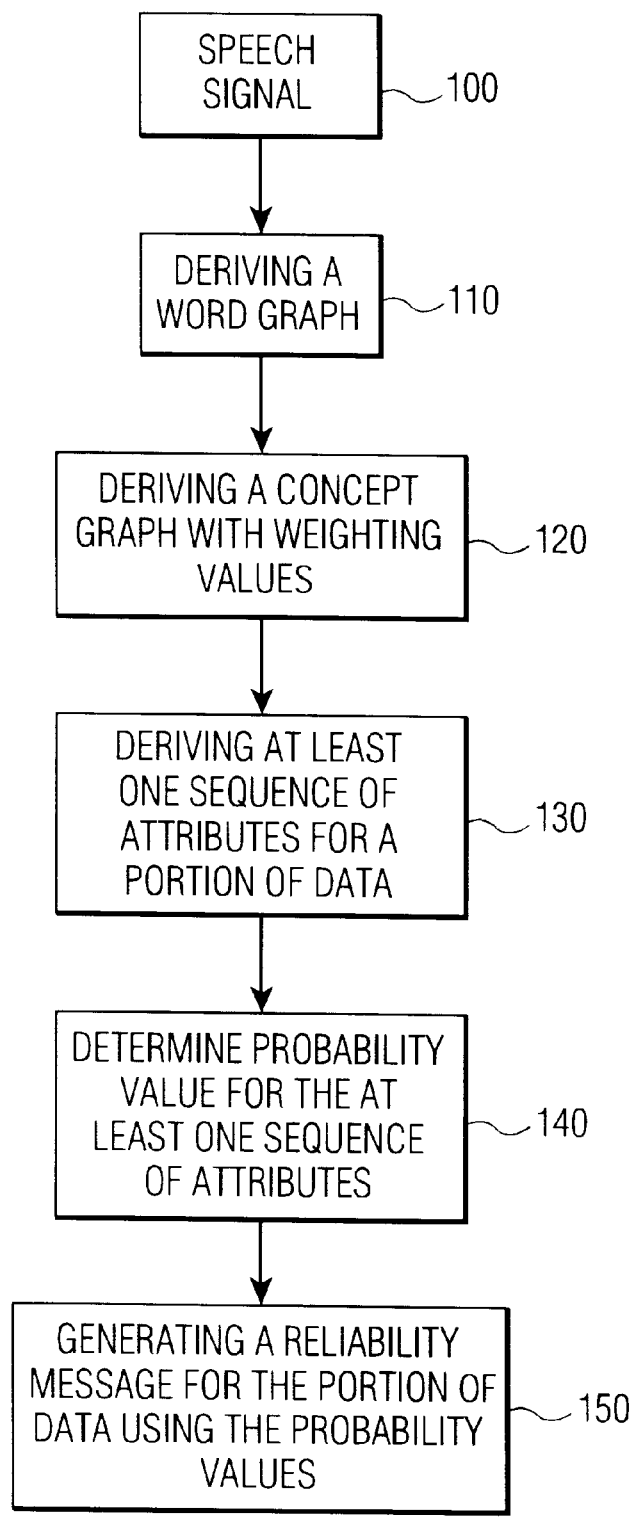
FIG. 1 illustrates an exemplary method in accordance with the principles of the present invention.

FIG. 1 is an exemplary method according to the principles of the present invention in which a reliability measure is determined for a portion of data. The data is coherently spoken language and a portion of data may be for example, the name of a train station.

In step 100, an input speech signal is provided, for example an inquiry for a particular train station departure time on a particular date. Subsequently in steps 110–120, a word graph and concept graph, with weighting values are derived. The concept graph may include the concepts "departure stations", "dates" and "times". Moreover, each concept may have a plurality of attributes, for example, train station names.

Figure 2:
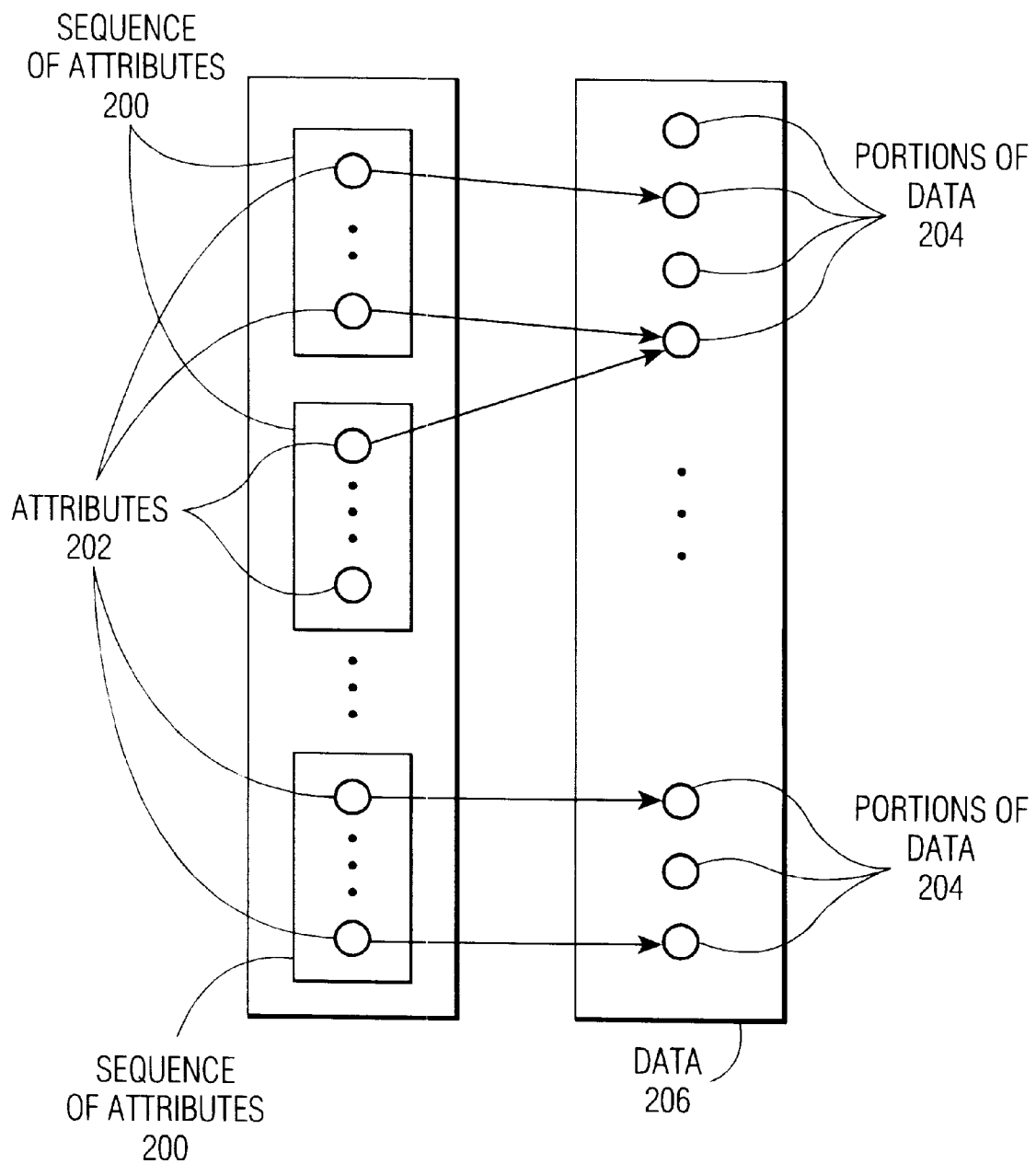
FIG. 2 illustrates illustrate an exemplary relationship between attributes of a sequence of attributes and portions of data.

In accordance with one aspect of the invention, in step 130, at least one sequence of attributes for the portion of data is derived, with weighting values assigned to each attribute. For example, as shown in FIG. 2, the sequence of attributes 200 includes the various attributes 202 assigned to particular portions of the data 204. For example, time, may be contained in the speech signal in various ways.

Returning now to FIG. 1, probability values are determined for the sequence of attributes, in step 140. A reliability measure is generated for portion of data using the probability values in step 150. Specifically, the reliability measure of the portion of data is determined from the sum of the probability values of all sequences in which the portion of data is contained.

The following merely illustrates the principles of the invention. It will thus be appreciated that those skilled in the art will be able to devise various arrangements which, although not explicitly described or shown herein, embody the principles of the invention and are included within its spirit and scope. Furthermore, all examples and conditional language recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the flow diagram herein represent conceptual views of illustrative methodology embodying the principles of the invention. Similarly, it will be appreciated that the flow diagram represent various processes which may be substantially represented in computer readable medium and so executed by a computer or processor, whether or not such computer or processor is explicitly shown.

What is claimed is:

1. A method of determining a reliability measure from a speech signal, comprising the steps of:
    deriving a word graph from the speech signal;
    deriving a concept graph with weighting values from said word graph;
    deriving a plurality sequences of attributes from the concept graph for a portion of data, with a weighting value being assigned to each sequence of attributes, wherein each attribute corresponds to a portion of the data;
    determining, from the weighting values of all sequences of attributes, probability values for said sequences; and
    generating a reliability measure for the portion of data using the sum of the probability values.

2. A method as claimed in claim 1, further including the step of determining at least a second weighting value corresponding to each sequence, which includes multiplying each weighting value by a first number, wherein the first number is smaller than 1.

3. A method as claimed in claim 2, further including the step of determining at least one second probability value using the second weighting values.

4. A method as claimed in claim 3, wherein the step of determining the at least one second probability value includes an exponential function, wherein the second weighting values are used a negative exponent for the base of the natural logarithm, and multiplication by a second number, the second number being chosen in such a way that the sum of the probability values of all sequences is equal to 1, and the reliability measure of the data result is derived from the sum of the probability values of the sequences comprising the portion of data.

* * * * *